United States Patent [19]
Blauer et al.

[11] Patent Number: 5,514,459
[45] Date of Patent: May 7, 1996

[54] WATERPROOF BREATHABLE LINING AND OUTERWEAR CONSTRUCTED THEREFROM

[75] Inventors: Stephen J. Blauer; Charles Blauer, both of Lexington, Mass.; Mark A. Mordecai, Hampton, N.H.

[73] Assignee: Blauer Manufacturing Company, Boston, Mass.

[21] Appl. No.: 430,811

[22] Filed: Apr. 28, 1995

Related U.S. Application Data

[63] Continuation-in-part of Ser. No. 222,524, Apr. 4, 1994, Pat. No. 5,466,515.

[51] Int. Cl.$^6$ ........................................................ B32B 7/00
[52] U.S. Cl. .................... 428/246; 428/252; 428/253; 428/304.4; 428/315.5; 428/315.9; 428/421; 428/422; 428/423.1
[58] Field of Search ...................... 428/109, 110, 428/116, 137, 138, 195, 246, 247, 252, 253, 304.4, 315.5, 421, 422, 423.1, 315.9

[56] References Cited

U.S. PATENT DOCUMENTS

| | | | |
|---|---|---|---|
| 3,438,829 | 4/1969 | Coe | 156/235 |
| 3,651,520 | 3/1972 | Jacob | 2/272 |
| 3,703,730 | 11/1972 | Miller | 2/272 |
| 3,794,548 | 2/1974 | Wirth et al. | 161/89 |
| 3,804,700 | 4/1974 | Hoey | 161/160 |
| 3,965,519 | 6/1976 | Hermann | 15/104.93 |
| 4,148,958 | 4/1979 | Tischer et al. | 428/196 |
| 4,159,360 | 6/1979 | Kim | 428/195 |

OTHER PUBLICATIONS

"The Facts About Sympatex®" Akzo Filers & Polymers Division, *Enka America, Inc.* (9 pages).
Specification Sheet Technical Information of W. L. Gore & Associates, Inc. (2 pages).
Gore-Tex® Specification "Get Out and Stay Out" W. L. Gore & Associates, Inc. (12-pages).
kris Krishnan, "Hydrophilic Urethanes for Textiles", 23 J. of Coated Fabrics 54 (Jul. 1993).

*Primary Examiner*—James J. Bell
*Attorney, Agent, or Firm*—Morse, Altman & Benson

[57] ABSTRACT

A fabric structure comprising a shell and a lining in close proximity to each other. The shell includes an outer closely woven synthetic fabric, a relatively high tensile strength pattern imprinted on the inner face thereof, and fluorocarbon impregnation thereof. The lining includes an intermediate outer synthetic polymer membrane, an inner synthetic polymer fabric, and optionally, an outer synthetic polymer fabric.

59 Claims, 2 Drawing Sheets

WATERPROOF BREATHABLE LINING AND OUTERWEAR CONSTRUCTED THEREFROM

RELATED APPLICATION

This application is a continuation-in-part of application Ser. No. 08/222,524 entitled WEATHER PROTECTIVE FABRIC COMBINATION, OUTERWEAR CONSTRUCTED THEREFROM, filed on Apr. 4, 1994 now U.S. Pat. No. 5,466,515, in the names of Stephen J. Blauer and Charles Blauer.

FIELD OF THE INVENTION

The present invention relates to fabric constructions for outerwear, and, more particularly, to fabric constructions for coats, pants, jackets, boots, gloves and other outer clothing that are designed for protection against inclement weather.

THE PRIOR ART

Clothing for inclement weather typically is constructed from fabrics or combinations of fabrics that strive to achieve seemingly inconsistent objectives. It is desired that such clothing be vapor permeable, water repellent, wind obstructing, stain resistant, dimensionally stable, externally durable, and internally comfortable. Vapor permeable membranes and/or tight weaving have been among the compromises needed to permit simultaneous vapor permeability, water repulsion, and wind obstruction. Special fabrics and/or coatings have been among the compromises needed for stain resistance, dimensional stability, external durability, and internal comfort. In particular, for example, the interstices within tightly woven fabric, which must remain open to achieve breathing, tend to become blocked by water proofing and wind blocking treatments. There is an ongoing need for the improvement of outerwear for protection against inclement weather.

BRIEF DESCRIPTION OF THE INVENTION

The present invention relates to outerwear comprising an outer shell and an inner lining that combine to achieve vapor permeability, water repellency, wind obstruction, stain resistance, dimensional stability, external durability, and internal comfort. More specifically, the present invention relates to a fabric construction comprising an outer shell and an inner lining that are characterized by particular materials and interrelationships.

The shell is composed of a tightly woven synthetic fabric, which initially has imprinted on its inner face a high tensile strength pattern, and which thereafter is impregnated with a protective coating. The lining is composed of either a soft synthetic fabric supporting a waterproof, breathable membrane or a waterproof, breathable membrane sandwiched between a pair of soft synthetic fabric supports. The membrane is either a separate film that is laminated to the fabric or a coating that is either formed on or adhered to the fabric. The membrane has a structure that is characterized by either mechanical micropore diameters or hydrophilic molecular intervals which are infinitesimally smaller in dimension than the interstices in the synthetic fabric of the shell. External durability and stain resistance are provided by the tightly woven synthetic fabric of the shell. Dimensional stability and ravel prevention is provided by the imprinted high tensile strength pattern. Water repellency and wind obstruction are provided to some degree by the tightly woven synthetic fabric of the shell and to a major degree by the membrane of the lining. Vapor transmission is enabled by the membrane of the lining and permitted by the interstices in the support for the membrane, the interstices in the synthetic fabric of the shell, and the openings in the pattern imprinted thereon. Comfortable contact with the wearer is provided by the fabric support for the breathable membrane.

The invention accordingly comprises the fabric structures, outerwear, and processes which are described in the following specification, the scope of which will be indicated in the appended claims.

BRIEF DESCRIPTION OF THE DRAWINGS

For a fuller understanding of the nature and objects of the present invention, reference is made to the accompanying drawings, wherein.

DETAILED DESCRIPTION OF THE PREFERRED EMBODIMENT

Figure 1:
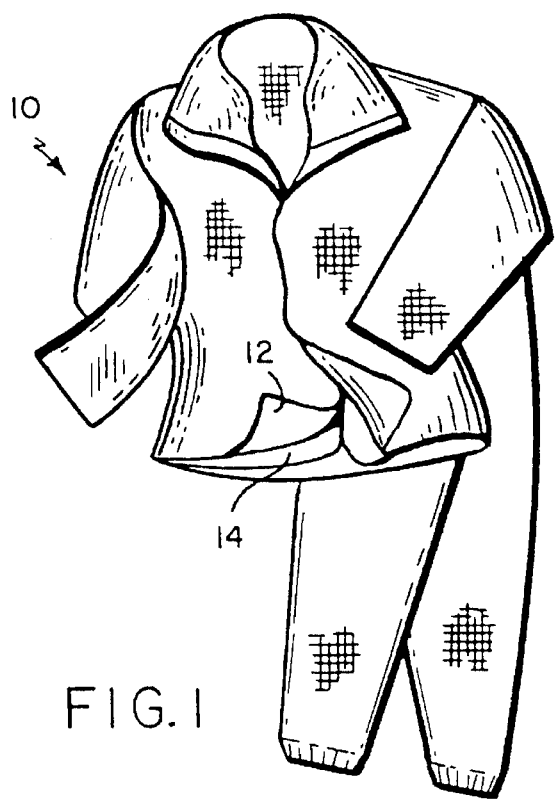
FIG. 1 is a perspective view of a storm coat and storm pants embodying the present invention.

FIG. 1 illustrates an outdoor outfit 10 consisting of a jacket and pants that embody the present invention. All of the major areas, i.e. bodice, arms and legs, comprise an outer shell 12 and an inner lining 14. FIGS. 2 to 10 illustrate details of the shell 12 and the lining 14, of which the illustrated clothing is constructed.

The Shell of FIGS. 2 and 5 to 10

Figure 2:
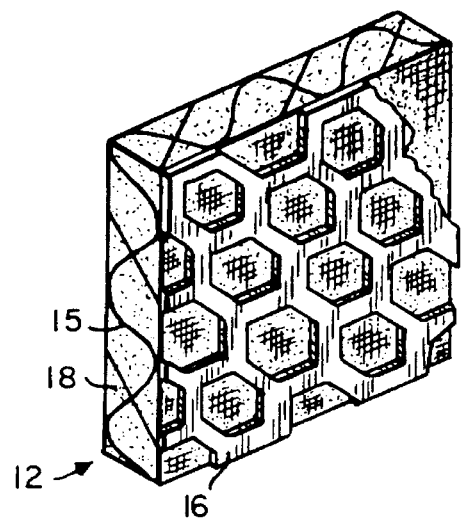
FIG. 2 is a grossly exaggerated view of the shell construction of the clothing of FIG. 1, cross-sectioned to illustrate fabric, impregnation, and molecular structure.
Figure 5:
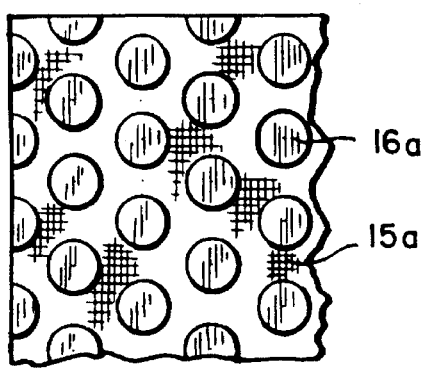
FIG. 5 illustrates one unconnected pattern that may be imprinted on the inner face of the shell.
Figure 6:
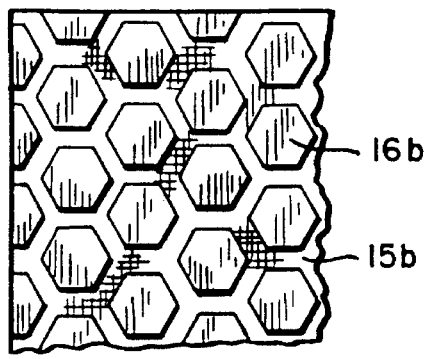
FIG. 6 illustrates a second unconnected pattern that may be imprinted on the inner face of the shell.
Figure 7:
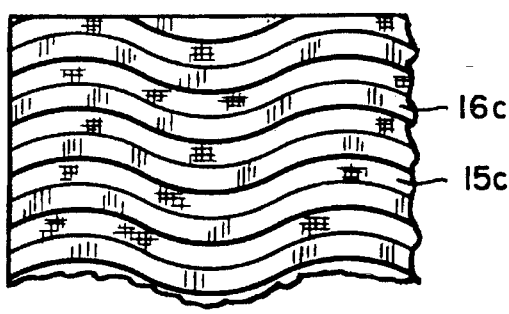
FIG. 7 illustrates a third unconnected pattern that may be imprinted on the inner face of the shell.

As shown in FIG. 2, the shell 12 generally comprises a closely woven, synthetic polymer fabric 15 that is characterized generally by a low level of water absorption, i.e. nylon, acrylic, or polyester. After being scoured and dyed, the inner face of the fabric 15 is directly imprinted with a pattern stratum 16 of a relatively high tensile strength, highly flexible elastomer, for example, an acrylic urethane. The imprinted pattern 16 provides the shell 12 with dimensional stability and prevents the fabric 15 from unraveling. Preferably, the pattern is characterized by solid portions that cover between 10 and 90% of the fabric 15 and weighs from 0.1 to 1 ounces per square yard. It has been discovered that a multiplicity of patterns, both unconnected and connected are satisfactory, provided that the coverage is from 10 to 90% of the fabric 15. Unconnected patterns are characterized by separate and discrete portions of elastomer. There are patterns that are unconnected in only one dimension, such as a set of wavy lines that extend from one side of the fabric to another, and patterns that are unconnected in two dimensions, such as a set of dots. Examples of unconnected patterns are shown in FIGS. 5 to 7, and include dots 16a, hexagons 16b, and wavy lines 16c.

Figure 8:
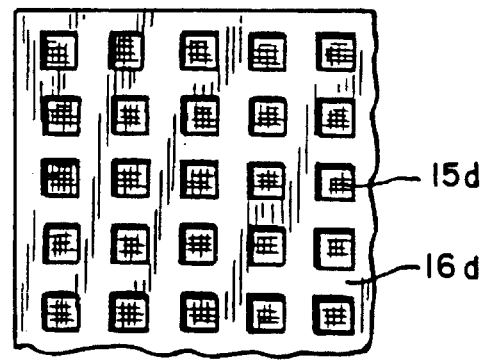
FIG. 8 illustrates one connected pattern that may be imprinted on the inner face of the shell.
Figure 9:
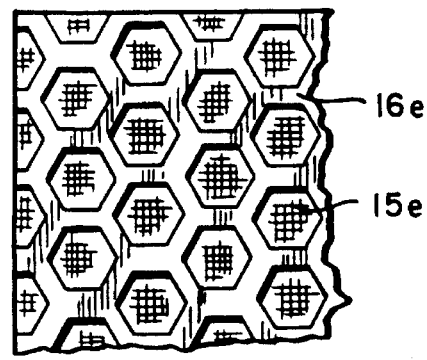
FIG. 9 illustrates a second connected pattern that may be imprinted on the inner face of the shell.
Figure 10:
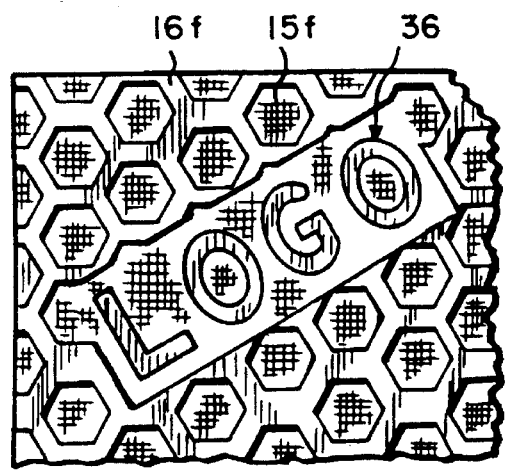
FIG. 10 illustrates a connected pattern with interruptions for a logo that may be imprinted on the inner face of the shell.

Connected patterns are patterns in which the elastomer is uninterrupted; that is, the pattern is a mesh. Examples of connected patterns are shown in FIGS. 8 and 9, and include contiguous hollow regular shapes with common sides, shapes such as squares 16d or hexagons 16e. As shown in FIG. 10, it may be noted that, even in connected patterns, there may be discontinuities 36 in the pattern 16f where, for example, a company logo might be placed.

Following imprinting of the pattern stratum 16, the entire fabric/pattern combination is impregnated with a finishing composition 18, preferably a fluorocarbon release agent that will not clog the interstices of the fabric.

Figure 3:
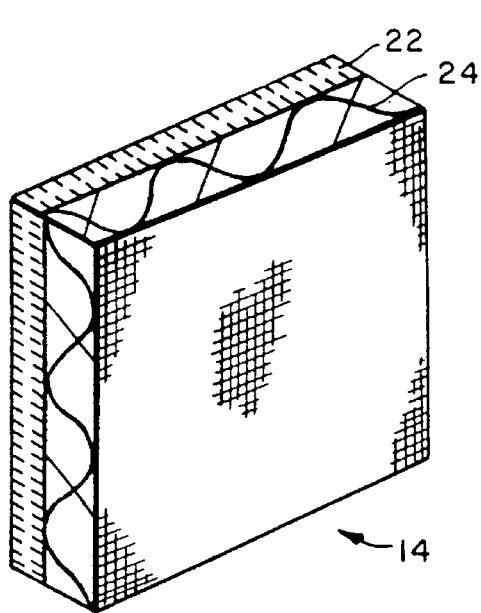
FIG. 3 is a grossly exaggerated cross-sectional view of one embodiment of the lining of the clothing of FIG. 1.
Figure 4:
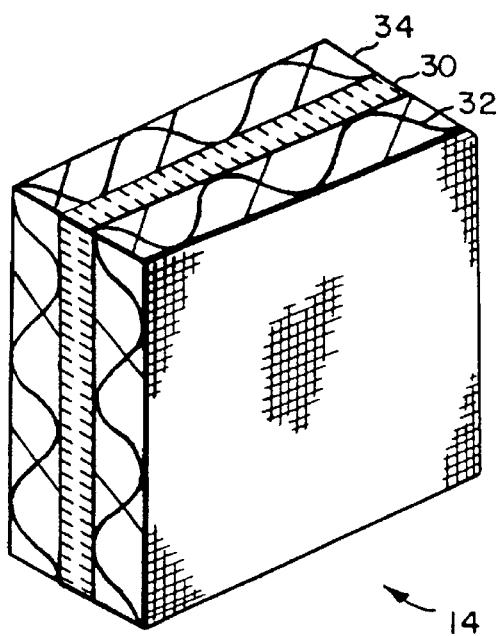
FIG. 4 is a grossly exaggerated cross-sectional view of another embodiment of the lining of the clothing of FIG. 1.

The Lining of FIGS. 3 and 4

In one embodiment of the present invention, shown in FIG. 3, the lining 14 comprises, at its outer face, a membrane stratum 22 and, at its inner face, a fabric stratum 24. The membrane stratum 22 is composed of a thin polymer which, by virtue of its physico-chemical structure, i.e. its microstructure or molecular structure, is capable of transmitting water vapor and of repelling liquid water. The fabric stratum 24 is a knitted or woven synthetic, such as polyester or nylon, that presents a soft, comfortable surface for contact with and drape about a wearer.

In another embodiment, shown in FIG. 4, a membrane stratum 30 is sandwiched between an outer fabric stratum 34 and an inner fabric stratum 32. The membrane stratum 30 is composed of a thin polymer which is capable of transmitting water vapor and of repelling liquid water. The inner fabric stratum 32 is shown as a knitted or woven synthetic polymer fabric and the outer fabric stratum 34 is shown as a knitted synthetic, where the synthetics are fabrics such as polyester or nylon.

In one embodiment of the present invention, the membrane stratum 22, 30 is composed of an expanded microporous polymer, i.e. a polymer which has been stretched to produce therethrough microscopic pores (micropores) that are sufficiently large to permit the transmission of water vapor, but that are too small to permit the passage of droplets of liquid water. Droplets of liquid water have a sufficiently large surface tension to preclude deformation necessary for passage through the micropores.

In another embodiment, the membrane stratum 22, 30 is a hydrophilic urethane polymer or a hydrophilic copolyester polymer. In these materials, water vapor travels along molecular chains through the thermal gradient established between a relatively high temperature at the surface of a wearer and a relatively low temperature remote from the surface of the wearer.

In a further embodiment, the membrane stratum 22, 30 is a combination of a microporous material and a hydrophilic material, thereby taking some of the characteristics of both materials.

In one embodiment of the present invention, the membrane stratum 22, 30 is a separate film that is laminated to the fabric stratum 24, 32, 34. In another embodiment, the membrane stratum 22, 30 is a coating that is formed on or adhered to the fabric stratum 24, 32, 34. There are several methods for forming the coating. Direct coating consists of depositing the coating material directly onto the fabric stratum 24, 32 and then smoothing the material to a layer that is approximately 1 mm thick. Cast coating entails depositing a uniformly thick layer of the coating on a release paper, adhering the exposed surface of the coating to the fabric stratum 24, 32, and removing the release paper.

EXAMPLES OF PREFERRED COMPONENTS

The following examples are preferred materials of the different components of the fabric construction of the present invention:

Example I—Shell Fabric 15

Cloth Type: 200 Denier nylon (warp), and 3-ply 70 denier taslanized nylon (filling), plain weave Count: warp: 114, filling: 52

Weight (uncoated): 5.5 ounces per square yard (±0.4 ounces)

Break Strength (pounds): warp: 351 (minimum), filling: 156 (minimum)

Tear Strength (lbs.): warp: 19 (minimum), filling: 8 (minimum)

Shrinkage: warp 2% (maximum), filling 2% (maximum)

Color Fastness and Crocking: Good

Example II—Shell Fabric 15

Cloth Type: 70 denier nylon (warp), and 2-ply 70 denier taslanized nylon (filling), plain weave Count: warp: 158, filling: 68

Weight: (uncoated): 3.0 ounces per sq. yd. (±0.4 ounces)

Break Strength (pounds): warp: 210 (minimum), filling: 100 (minimum)

Tear Strength (lbs): warp: 4 (minimum), filling: 6 (minimum)

Shrinkage: warp 2% (maximum), filling 2% (maximum)

Color Fastness and Crocking: Good 20/40 hours

Example III—Printed Pattern 16

A printed, non-ravel, honeycomb-pattern coating to ensure breathability, prevent seam slippage and fabric unraveling, and to maintain shell fabric appearance. The coating consists of an aqueous blend of acrylic, urethane and silicone. The resulting pattern consists of a terpolymer which on drying contains about 12 to 30% urethane, about 1% silicone, and a roughly remainder of acrylic. During printing, the viscosity is adjusted so that it may be applied with a rotary screen printing head onto dyed fabric using a rotary screen having the desired pattern. In the present case, the screen is designed to have a hexagonal pattern, where the hexagonal shapes are hollow and contiguous with common sides. The pattern has about a 50% coverage and 9 cells per linear inch. Preferred coating weight add-on is in the range of 0.3 to 0.5 ounces per square yard. A formulation of this type is sold by Lyons Coatings, Inc., Franklin, Mass., under the trade designation Coating Compound 975-3.

Example IV—Printed Pattern 16

A printed, non-ravel, wavy line-pattern coating to ensure breathability, prevent seam slippage and fabric unraveling, and to maintain shell fabric appearance. The coating consists of an aqueous blend of acrylic, urethane and silicone. The resulting pattern consists of a terpolymer which on drying contains about 12 to 30% urethane, about 1% silicone, and a roughly remainder of acrylic. During printing, the viscosity is adjusted so that it may be applied with a rotary screen printing head onto dyed fabric using a rotary screen having the desired pattern. In the present case, the screen is designed to have a wavy-line pattern, such that the lines are continous from one edge of the fabric 15 to the opposite edge. The lines are approximately sinusoidal is shape and are about ⅛ inches in width and about ⅛ inches apart. The pattern has about a 50% coverage. Preferred coating weight add-on is in the range of 0.3 to 0.5 ounces per square yard. A formulation of this type is sold by Lyons Coatings, Inc., Franklin, Mass., under the trade designation Coating Compound 975-3.

Example V—Printed Pattern 16

A printed, non-ravel, dot-pattern coating to ensure breathability, prevent seam slippage and fabric unraveling, and to maintain shell fabric appearance. The coating consists of an aqueous blend of acrylic, urethane and silicone. The resulting pattern consists of a terpolymer which on drying contains about 12 to 30% urethane, about 1% silicone, and a roughly remainder of acrylic. During printing, the viscosity is adjusted so that it may be applied with a rotary screen printing head onto dyed fabric using a rotary screen having the desired pattern. In the present case, the screen is designed to have a circular dot pattern with about 50% coverage and 9 dots per linear inch with each dot being about ⅛ inches in diameter. Preferred coating weight add-on is in the range of 0.3 to 0.5 ounces per square yard. A formulation of this type is sold by Lyons Coatings, Inc., Franklin, Mass., under the trade designation Coating Compound 975-3.

Example VI—Protective Impregnation 18

After pattern 16 has been applied and dried, shell 12 is given a water repellent treatment which consists of a protective material being applied onto the surface and dried in a manner which is well understood by those skilled in the art. One such coating is a fluorocarbon solution sold by 3M under the trade designation SCOTCHGARD®. It has been found that durability of pattern 16 and its adhesion to fabric 15 is optimum when protective impregnation 18 occurs after pattern 16 has been applied.

Example VII—Lining Fabric 24, 32, 34

The lining fabric 24, 32, 34 is a nylon weave or knit. This fabric has the following specifications:

Cloth Type: 40 denier single ply 100% nylon weave or knit
Count: Wales: 39, Courses: 40

Example VIII—Lining Fabric 24, 32, 34

The lining fabric 24, 32, 34 is a polyester weave or knit. The fabric has the following specifications:

Cloth Type: 100% texturized polyester, 70 denier warp and filling
Count: warp: 102, filling: 102
Weight: 2.18 ounces per square yard Example IX—Vapor Permeable Membrane 22, 30

Membrane 22, 30 is a porous composite film that is laminated to the lining fabric 24, 32, 34. The film 22, 30 is made from two components. One component is pure expanded polytetrafluoroethylene. This portion of the film 22, 30 contains about nine billion pores per square inch. The pores are much smaller than a droplet of liquid water but much larger than a molecule of water vapor. Liquid water cannot pass through the film 22, 30 but moisture vapor can pass through. The other component is polyalkylene oxide polyurethane-urea, an oleophobic substance that prevents contamination of the film 22, 30 from oils, cosmetics, insect repellents, food substances, and other hazards. Porous films of this type are sold under the trade designation GORE-TEX® by W. L. Gore & Associates, Inc., Elkton, Md. This film has the following specifications:

Weight (ounces per square yard): 0.75±0.25
Breathability (MVTR grams per square meter per 24 hours): 650 minimum, ASTM E-96-80 Procedure B
Hydrostatic Resistance (pounds per square inch): 60 minimum, Federal Standard 191, Method 5512 (Mullen Tester)

Example X—Vapor Permeable Membrane 22, 30

Membrane 22, 30 is a microporous coating. The coating is either directly applied to the lining fabric 24, 32 or is applied to a release paper, adhered to the lining fabric 24, 32, and the release paper removed. The micropores in the coating are much smaller than a droplet of liquid water but much larger than a molecule of water vapor. Liquid water cannot pass through the membrane 22, 30 but moisture vapor can pass through. Porous coatings of this type are sold under the trade designation ULTREX® II by Burlington Industries of Burlington, N.Y. This coating has the following specifications:

Raw Material: Polyurethane
Spray Rating: 100, AATCC-22-85
Suter Hydrostatic (millimeters): greater than 1275, AATCC-127-85
Rain Test (grams): 0.02, AATCC-35-85, 3 feet for 5 minutes
Impact Penetration (grams): 0.01, AATCC-42-80
Breathability (MVTR grams per square meter per 24 hours): 250–600, ASTM E-96-80, 74° F.@49% relative humidity Example XI—Vapor Permeable Membrane 22, 30

Membrane 22, 30 is a non-porous, hydrophilic polyester ether film that is laminated to the lining fabric 24, 32, 34. The film has molecular chains that have a water vapor conductive or capillary effect. Water vapor enters into the closed membrane and moves along the molecular chains. The direction of movement is determined by the water vapor concentration gradient between the front and back of the membrane. In the vicinity of a textile, water vapor is mixed with air. As the temperature of air rises, it can absorb increasing concentrations of water vapor. For example, the warm air between skin and clothing can absorb up to approximately 40 µg/m$^3$ of water vapor, and outside air at 20° C. up to 17 µg/m$^3$. Even in rainy weather, the water vapor concentration is higher on the side closest to the skin than on the outside. This results in transport of water vapor from inside to outside. Non-porous hydrophilic polyesters of this type are sold under the trade designation SYMPATEX® by Ekzo of Arnheim, Netherlands. This film has the following specifications:

| | |
|---|---|
| Raw material: | hydrophilic polyester ether |
| Structure: | homogeneous, non-porous |
| Density: | 1.27 grams per cubic meter |
| Thickness: | 15 μm |
| Width: | 155 cm |
| Visual properties: | colorless, transparent, slightly opaque |
| Softening point: | above 200° C. |
| Melting point: | above 220° C. |
| Shrinkage in hot air: | slight shrinkage (<1%) up to 200° C. |
| Strength: | more than 1.5 daN/5 cm |
| Stretch before tearing: | approximately 300% |
| Permanent stretch: | approximately 20% after 50% overall stretch |
| Recovery: | up to approximately 4% overall stretching no residual stretching |
| Moisture absorption: | 1.6% at 50% relative humidity, 20° C. |
| Windproofness: | no air passage (DIN 53887) |
| Water absorption: | approximately 5% at 20° C. after wetting and spin drying |
| Water vapor permeability: | above 2500 grams per square meter per 24 hours ASTM E 96-66 (method B, modified) |
| Water tightness: | no water permeation at 1 bar = 10 meter water column (DIN 53886) |

Example XII—Vapor Permeable Membrane 22, 30

Membrane 22, 30 is a non-porous, hydrophilic polyurethane coating. The coating is either directly applied to the lining fabric 24, 32 or is applied to a release paper, adhered to the lining fabric 24, 32, and the release paper removed. The coating has molecular chains that have a water vapor conductive or capillary effect. Water vapor enters into the coating and moves along the molecular chains. The direction of movement is determined by the water vapor concentration gradient between the front and back of the coating. In the vicinity of a textile, water vapor is mixed with air. As the temperature of air rises, it can absorb increasing concentrations of water vapor. For example, the warm air between skin and clothing can absorb up to approximately 40 μg/m³ of water vapor, and outside air at 20° C. up to 17 μg/m³. Even in rainy weather, the water vapor concentration is higher on the side closest to the skin than on the outside. This results in transport of water vapor from inside to outside. Non-porous hydrophilic polyurethanes of this type are sold under the trade designation TRAVTECH® by Travis Textiles, Inc., New York, N.Y. This coating has the following specifications:

Raw material: hydrophilic polyurethane that is the reaction product of an organic polyisocyanate, poly(alkalenether)glycol, poly(oxyethylene)glycol, and a reactive hydroxyl group-containing poly(dimethyl siloxane) with a functionality of two or more Water vapor permeability (grams per square meter per 24 hours): 500–600, ASTM E 96

Hydrostatic Resistance (pounds per square inch): 100, 50 after 5 launderings, Method 5512 (Mullen Tester)

Spray Rating: 90–100, 50–70 after 5 launderings, Method AATCC-22

EXAMPLES OF PREFERRED COMBINATIONS

The following examples are preferred combinations of the above-described components of the present invention:

Example XIII—Preferred Combination A

A preferred combination of shell and lining comprises the following:

Shell fabric 15: nylon as specified in Example I

Pattern 16: connected hexagonal pattern as specified in Example III

Protective impregnation 18: fluorocarbon as specified in Example VI

Lining fabric 24: Polyester weave as specified in Example VIII

Membrane 22: polytetrafluorethylene, polyalkylene oxide polyurethane urea composite film as specified in Example IX Example XIV—Preferred Combination B Another preferred combination of shell and lining comprises the following:

Shell fabric 15: nylon as specified in Example I

Pattern 16: connected hexagonal pattern as specified in Example III

Protective impregnation 18: fluorocarbon as specified in Example VI

Outer lining fabric 34: nylon knit as specified in Example VII

Membrane 30: polytetrafluorethylene, polyalkylene oxide polyurethane urea composite film as specified in Example IX Inner lining fabric 32: polyester weave as specified in Example VIII Example XV—Preferred Combination C Another preferred combination of shell and lining comprises the following:

Shell fabric 15: nylon as specified in Example II

Pattern 16: unconnected wavy-line pattern as specified in Example IV

Protective impregnation 18: fluorocarbon as specified in Example VI

Lining fabric 24: Nylon knit or weave as specified in Example VII

Membrane 22: microporous polyurethane coating as specified in Example X

Example XVI—Preferred Combination D

Another preferred combination of shell and lining comprises the following:

Shell fabric 15: nylon as specified in Example I

Pattern 16: unconnected dot pattern as specified in Example V

Protective impregnation 18: fluorocarbon as specified in Example VI

Lining fabric 24: Nylon knit or weave as specified in Example VII

Membrane 22: hydrophilic polyester ether film as specified in Example XI

Example XVII—Preferred Combination E

Another preferred combination of shell and lining comprises the following:

Shell fabric 15: nylon as specified in Example I

Pattern 16: unconnected dot pattern as specified in Example V

Protective impregnation 18: fluorocarbon as specified in Example VI

Outer lining fabric 34: polyester knit as specified in Example VIII

Membrane 30: hydrophilic polyurethane coating as specified in Example XII

Inner lining fabric 32: Nylon weave as specified in Example VII

OPERATION

A shell and a lining cooperate in the following manner: Vapor permeability is enabled by a hydrophilic or microporous membrane, in cooperation with the openings in a printed pattern and the interstices of an inner fabric strata. Water repellency is achieved by a treated outer fabric, and by the membrane which protects against seepage through the inner fabric. Wind obstruction is achieved by the outer fabric and the membrane. Stain resistance and durability are achieved by the outer fabric and a treatment to which it has been subjected. The inner fabric has a pleasant hand and feel. The construction ensures a comfortable balance among evaporation, conduction, and convection in the space between the shell and the lining.

What is claimed is:

1. A fabric structure comprising a shell and a lining secured in close proximity to each other and spaced from each other over a majority of the areas of said shell and said lining:
   (a) said shell including an outer, closely woven synthetic fabric, a pattern imprinted on the inner face thereof, and release agent impregnation thereof;
   (b) said lining including an intermediate synthetic polymer water-vapor-permeable membrane and an inner synthetic polymer fabric;
   (c) said pattern being characterized by partial coverage of the area of said outer shell fabric; and
   (d) said pattern being composed of a high tensile strength material that is adhesively bonded to said shell outer fabric, adhesively free of said lining, and adapted to prevent said shell outer fabric from unraveling.

2. The fabric structure of claim 1 wherein said pattern is characterized by from 10 to 90% coverage of the area of said outer shell fabric.

3. The fabric structure of claim 1 wherein said imprinted pattern is in direct contact with said shell outer fabric and said contact is substantially free of said release agent.

4. The fabric structure of claim 1 wherein said pattern is composed of a urethane polymer.

5. The fabric structure of claim 1 wherein said pattern is characterized substantially by a mesh.

6. The fabric structure of claim 1 wherein said pattern is characterized substantially by a mesh with interruptions for at least one representation.

7. The fabric structure of claim 1 wherein said pattern is characterized by a plurality of discrete portions.

8. The fabric structure of claim 1 wherein said pattern is characterized by a plurality of discrete portions in a repeating configuration with interruptions for at least one representation.

9. The fabric structure of claim 1 wherein said membrane is microporous.

10. The fabric structure of claim 1 wherein said membrane includes an expanded polytetrafluoroethylene having micropores.

11. The fabric structure of claim 1 wherein said membrane is a hydrophilic polyester ether.

12. The fabric structure of claim 1 wherein said membrane is a hydrophilic urethane.

13. The fabric structure of claim 1 wherein said membrane is a film laminated to said lining inner fabric.

14. The fabric structure of claim 1 wherein said membrane is a coating applied directly to said lining inner fabric.

15. The fabric structure of claim 1 wherein said membrane is a cast coating applied to said lining inner fabric.

16. The fabric structure of claim 1 wherein said lining inner fabric is hydrophobic and is selected from the class consisting of nylon and polyester.

17. A fabric structure comprising a shell and a lining secured in close proximity to each other and spaced from each other over a majority of the areas of said shell and said lining:
   (a) said shell including an outer, closely woven synthetic fabric, a pattern imprinted on the inner face thereof, and release agent impregnation thereof;
   (b) said lining including an outer synthetic polymer fabric, an intermediate synthetic polymer water-vapor-permeable membrane, and an inner synthetic polymer fabric;
   (c) said pattern being characterized by partial coverage of the area of said shell outer fabric; and
   (d) said pattern being composed of a high tensile strength material that is adhesively bonded to said shell outer fabric, adhesively free of said lining, and adapted to prevent said shell outer fabric from unraveling.

18. The fabric structure of claim 17 wherein said pattern is characterized by from 10 to 90% coverage of the area of said outer shell fabric.

19. The fabric structure of claim 17 wherein said imprinted pattern is in direct contact with said shell outer fabric and said contact is substantially free of said release agent.

20. The fabric structure of claim 17 wherein said pattern is composed of a urethane polymer.

21. The fabric structure of claim 17 wherein said pattern is characterized substantially by a mesh.

22. The fabric structure of claim 17 wherein said pattern is characterized substantially by a mesh with interruptions for at least one representation.

23. The fabric structure of claim 17 wherein said pattern is characterized by a plurality of discrete portions.

24. The fabric structure of claim 17 wherein said pattern is characterized by a plurality of discrete portions in a repeating configuration with interruptions for at least one representation.

25. The fabric structure of claim 17 wherein said membrane is microporous.

26. The fabric structure of claim 17 wherein said membrane includes an expanded polytetrafluoroethylene having micropores.

27. The fabric structure of claim 17 wherein said membrane is a polyester ether.

28. The fabric structure of claim 17 wherein said membrane is a hydrophilic urethane.

29. The fabric structure of claim 17 wherein said membrane is a film laminated to and positioned between said lining inner fabric and said lining outer fabric.

30. The fabric structure of claim 17 wherein said membrane is a coating applied directly to at least one of said lining inner fabric and said lining outer fabric and positioned between said lining inner fabric and said lining outer fabric.

31. The fabric structure of claim 17 wherein said membrane is a cast coating applied to at least one of said lining inner fabric and said lining outer fabric and positioned between said lining inner fabric and said lining outer fabric.

32. The fabric structure of claim 17 wherein said lining inner fabric is hydrophobic and is selected from the class consisting of nylon and polyester.

33. The fabric structure of claim 17 wherein said lining outer fabric is a knit fabric selected from the class consisting of nylon and polyester.

34. A fabric structure comprising a shell and a lining secured in close proximity to each other and spaced from each other over a majority of the areas of said shell and said lining:
  (a) said shell including an outer, closely woven synthetic fabric, a pattern imprinted on the inner face thereof, and release agent impregnation thereof;
  (b) said lining including an intermediate synthetic polymer water-vapor-permeable membrane and an inner synthetic polymer fabric;
  (c) said pattern being characterized by partial coverage of the area of said outer shell fabric;
  (d) said pattern being composed of a high tensile strength material that is adhesively bonded to said shell outer fabric, adhesively free of said lining, and adapted to prevent said shell outer fabric from unraveling and to maintain the shape of said shell;
  (e) said imprinted pattern being in direct contact with said shell outer fabric and said contact being substantially free of said release agent;
  (f) said shell outer fabric being selected from the class consisting of nylon, acrylic, and polyester;
  (g) said pattern being composed of a urethane polymer;
  (h) said release agent being a fluorocarbon; and
  (i) said lining inner fabric being hydrophobic and being selected from the class consisting of nylon and polyester.

35. The fabric structure of claim 34 wherein said pattern is characterized by from 10 to 90% coverage of the area of said outer shell fabric.

36. The fabric structure of claim 34 wherein said pattern is characterized substantially by a mesh.

37. The fabric structure of claim 34 wherein said pattern is characterized substantially by a mesh with interruptions for at least one representation.

38. The fabric structure of claim 34 wherein said pattern is characterized by a plurality of discrete portions.

39. The fabric structure of claim 34 wherein said pattern is characterized by a plurality of discrete portions in a repeating configuration with interruptions for at least one representation.

40. The fabric structure of claim 34 wherein said membrane is microporous.

41. The fabric structure of claim 34 wherein said membrane includes an expanded polytetrafluoroethylene having micropores.

42. The fabric structure of claim 34 wherein said membrane is a polyester ether.

43. The fabric structure of claim 34 wherein said membrane is a hydrophilic urethane.

44. The fabric structure of claim 34 wherein said membrane is a film laminated to said lining inner fabric.

45. The fabric structure of claim 34 wherein said membrane is a coating applied directly to said lining inner fabric.

46. The fabric structure of claim 34 wherein said membrane is a cast coating applied to said lining inner fabric.

47. A fabric structure comprising a shell and a lining secured in close proximity to each other and spaced from each other over a majority of the areas of said shell and said lining:
  (a) said shell including an outer, closely woven synthetic fabric, a pattern imprinted on the inner face thereof, and release agent impregnation thereof;
  (b) said lining including an outer synthetic polymer fabric, an intermediate synthetic polymer water-vapor-permeable membrane, and an inner synthetic polymer fabric;
  (c) said pattern being characterized by partial coverage of the area of said outer shell fabric;
  (d) said pattern being composed of a high tensile strength material that is adhesively bonded to said shell outer fabric, adhesively free of said lining, and adapted to prevent said shell outer fabric from unraveling and to maintain the shape of said shell;
  (e) said imprinted pattern being in direct contact with said shell outer fabric and said contact being substantially free of said release agent;
  (f) said shell outer fabric being selected from the class consisting of nylon, acrylic, and polyester;
  (g) said pattern being composed of a urethane polymer;
  (h) said release agent being a fluorocarbon;
  (i) said lining inner fabric being hydrophobic and being selected from the class consisting of nylon and polyester; and
  (j) said lining outer fabric being a knit fabric selected from the class consisting of nylon and polyester.

48. The fabric structure of claim 47 wherein said pattern is characterized by from 10 to 90% coverage of the area of said outer shell fabric.

49. The fabric structure of claim 47 wherein said pattern is characterized substantially by a mesh.

50. The fabric structure of claim 47 wherein said pattern is characterized substantially by a mesh with interruptions for at least one representation.

51. The fabric structure of claim 47 wherein said pattern is characterized by a plurality of discrete portions.

52. The fabric structure of claim 47 wherein said pattern is characterized by a plurality of discrete portions in a repeating configuration with interruptions for at least one representation.

53. The fabric structure of claim 47 wherein said membrane is microporous.

54. The fabric structure of claim 47 wherein said membrane includes an expanded polytetrafluoroethylene having micropores.

55. The fabric structure of claim 47 wherein said membrane is a polyester ether.

56. The fabric structure of claim 47 wherein said membrane is a hydrophilic urethane.

57. The fabric structure of claim 47 wherein said membrane is a film laminated to and positioned between said lining inner fabric and said lining outer fabric.

58. The fabric structure of claim 47 wherein said membrane is a coating applied directly to at least one of said lining inner fabric and said lining outer fabric and positioned between said lining inner fabric and said lining outer fabric.

59. The fabric structure of claim 47 wherein said membrane is a cast coating applied to at least one of said lining inner fabric and said lining outer fabric and positioned between said lining inner fabric and said lining outer fabric.

* * * * *